Aug. 18, 1964  W. E. BURRELL  3,144,915

DIRECTIONALLY SELECTIVE LUBRICATING SYSTEM

Filed June 4, 1962  5 Sheets-Sheet 1

INVENTOR
William E. Burrell

BY

AGENT

Aug. 18, 1964  W. E. BURRELL  3,144,915
DIRECTIONALLY SELECTIVE LUBRICATING SYSTEM
Filed June 4, 1962  5 Sheets-Sheet 2

INVENTOR
William E. Burrell

BY

AGENT

Aug. 18, 1964  W. E. BURRELL  3,144,915
DIRECTIONALLY SELECTIVE LUBRICATING SYSTEM
Filed June 4, 1962  5 Sheets-Sheet 3

INVENTOR
William E. Burrell

BY

AGENT

INVENTOR
William E. Burrell

AGENT

Aug. 18, 1964          W. E. BURRELL          3,144,915
DIRECTIONALLY SELECTIVE LUBRICATING SYSTEM
Filed June 4, 1962                     5 Sheets-Sheet 5

INVENTOR
William E. Burrell

BY

AGENT

United States Patent Office 3,144,915
Patented Aug. 18, 1964

3,144,915
DIRECTIONALLY SELECTIVE LUBRICATING SYSTEM
William E. Burrell, 2037 SE. Harold St., Portland, Oreg.
Filed June 4, 1962, Ser. No. 199,821
7 Claims. (Cl. 184—3)

This invention relates generally to means for the selective application of grease as required from a single source to multiple points of wear of moving machinery such as the areas of contact of the wheel flanges of the driving locomotive of a train with the head flanges of the rails of a track over which the train is operating.

More particularly this invention relates to a means for selectively greasing only the forwardly driving two wheels each of the two driving trucks of the locomotive normally leading the train.

For special or unusual duty the number of grease distributors and number of points of grease application can be selected as desired, either by the number of grease points per distributor or the number of distributors per locomotive or the number of locomotives per train.

The present trend of diesel oil or electric locomotive design is to support the main frame or body of the locomotive on a pair of similar trucks each having two spaced parallel wheels on each of two spaced parallel axles per truck and the two trucks spaced at opposite ends of the locomotive. Then depending on the terrain over which the road bed is laid, the length of the train and the number of locomotives per train may be varied. For good operating practice and standardization of equipment, one or more similar locomotives will be used on a train.

Commonly, where the track is reasonably straight and reasonably level and the train is not too long, a single locomotive will be used at the forward end of the train.

Where the conditions are such that a second locomotive is needed it may be located according to the judgement of the trainmaster at either end of the train or nearer the middle thereof depending on the desired makeup of the train for picking up or dropping of cars to or from the train. In any case the lubricating system of this invention is arranged for selective lubrication at preset intervals of the flanges of the forwardly rolling wheels and thereby the gauge sides of the track rails.

As a typical example of the use of the present system, the elements of the system will be shown in the following figures of the drawing in which FIG. 1 shows an elementary scheme of the system in front elevation.

Figure 4:
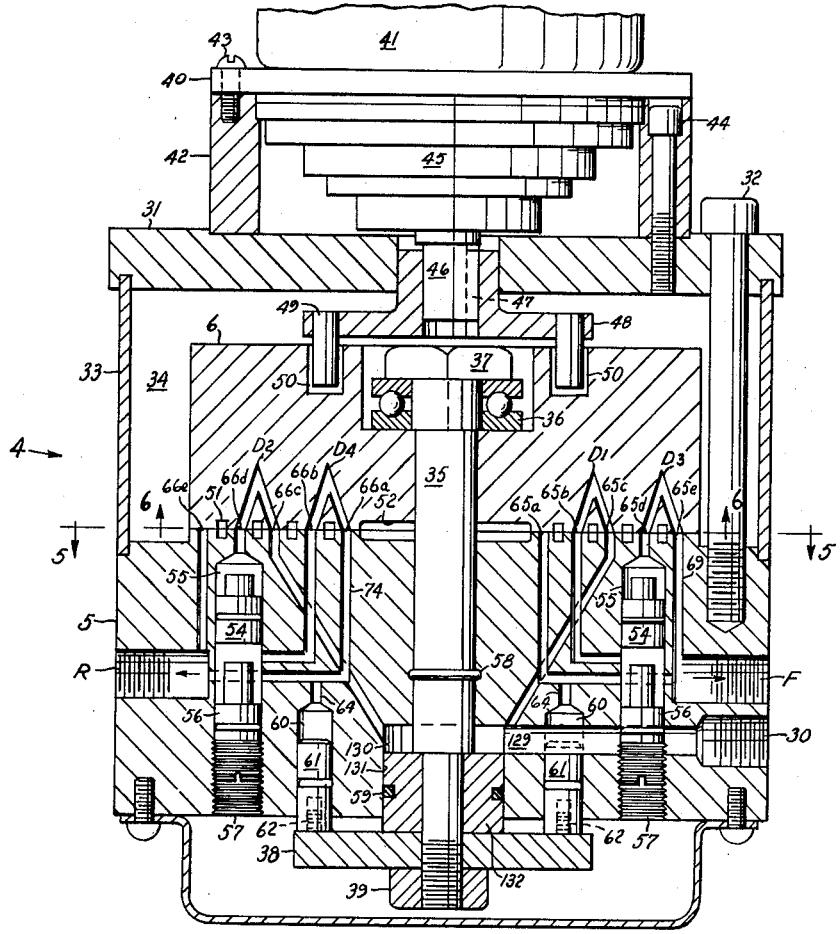
FIG. 4 shows a fragmentary vertical elevation in partial section of the grease distributor 4 of this invention.
Figure 5:
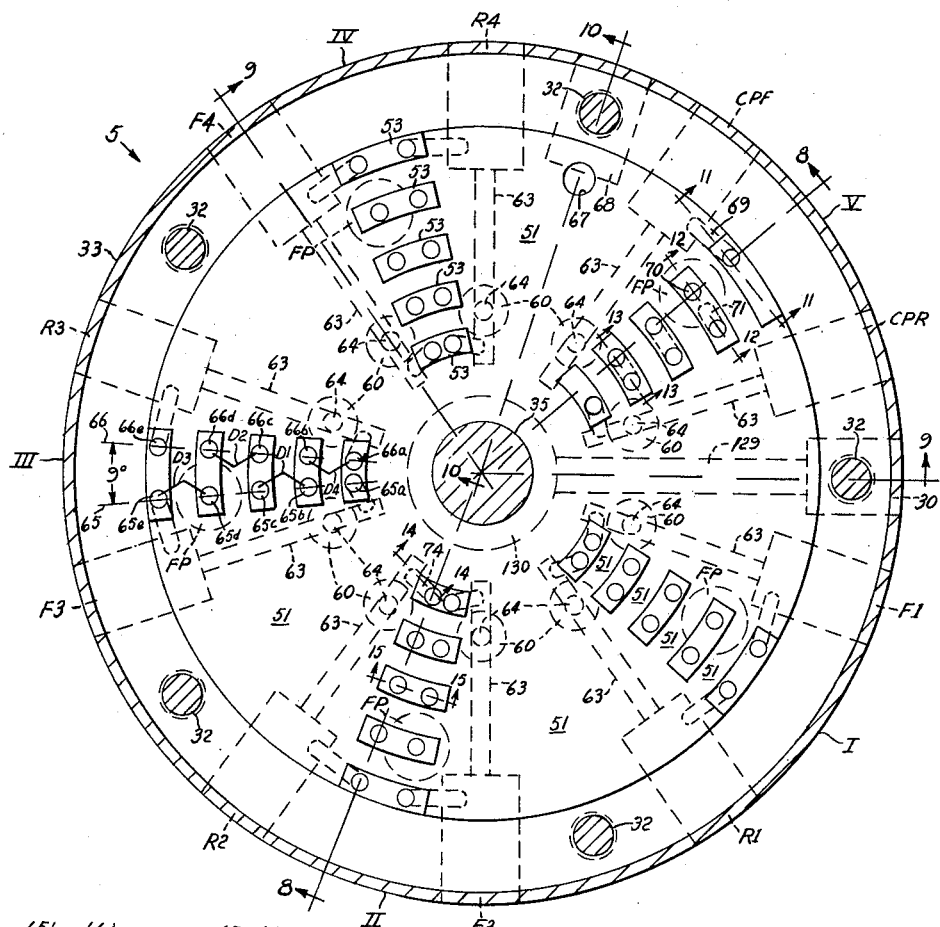

FIG. 5 shows a top plan view of the stationary body 5 of the distributor 4 of this invention as viewed along the plane 5—5 of FIG. 4.

Figure 6:
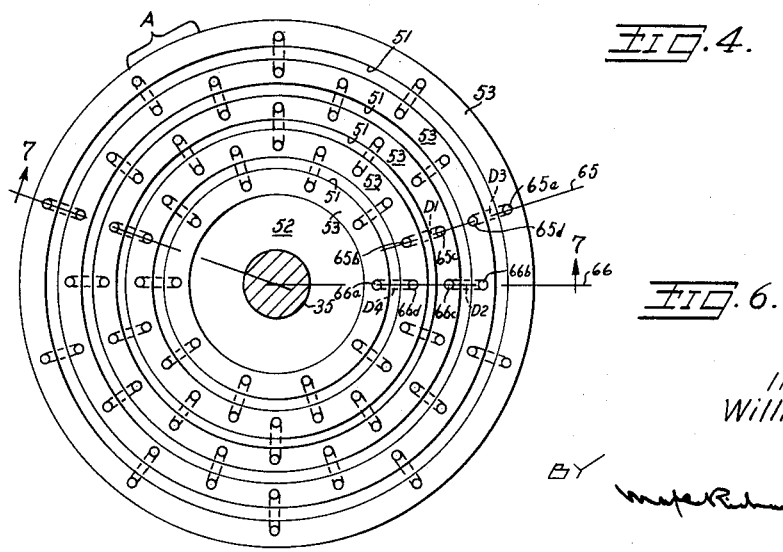

FIG. 6 shows a bottom plan view of the rotary slide valve 6 of the distributor 4 of this invention as viewed along the plane 6—6 of FIG. 4.

Figure 7:
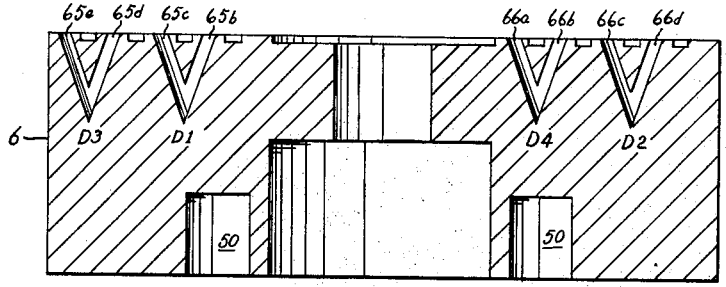

FIG. 7 is a view in sectional elevation of the slide valve 6 of this invention as viewed along the angled plane 7—7 of FIG. 6.

Figure 8:
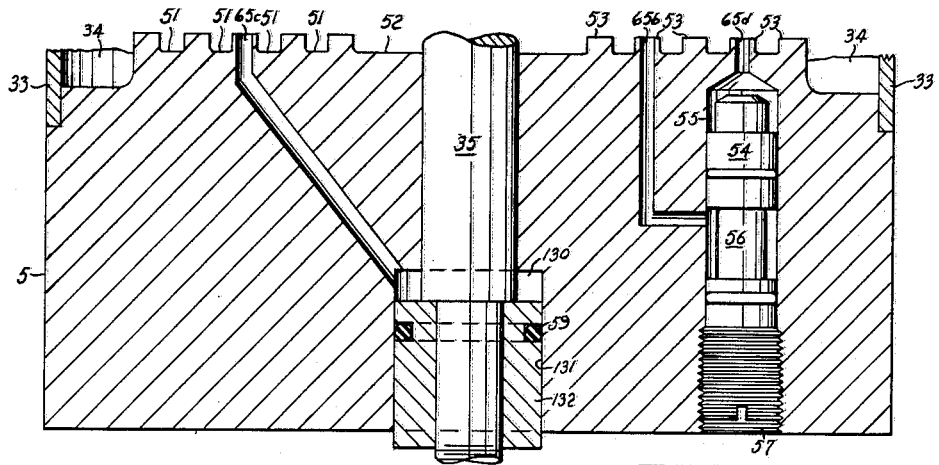

FIG. 8 is a view in sectional elevation of the body 5 of distributor 4 as viewed along the angled plane 8—8 of FIG. 5.

Figure 9:
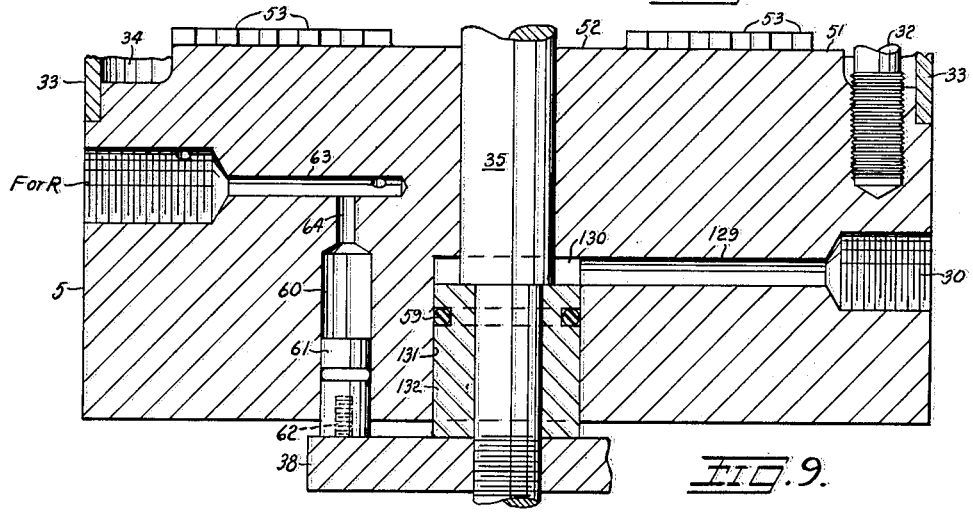

FIG. 9 is a view in sectional elevation of the body 5 of distributor 4 as viewed along the angled plane 9—9 of FIG. 5.

Figure 10:
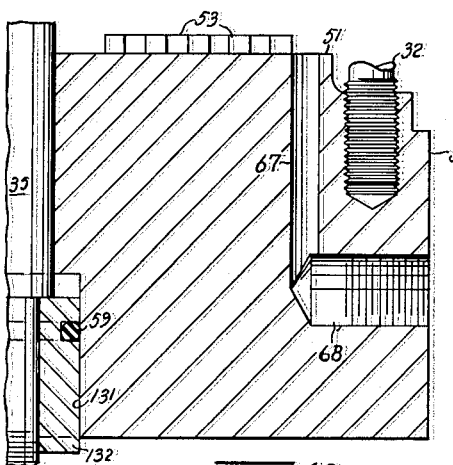

FIG. 10 is a fragmental view in sectional elevation of the body 5 of distributor 4 as viewed along the plane 10—10 of FIG. 5.

Figures 11, 12, 14:
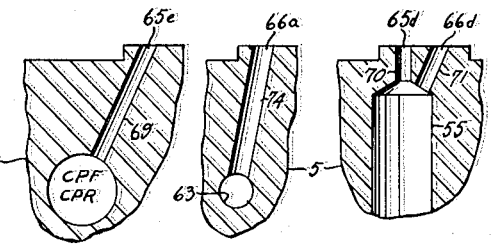

FIG. 11 is a fragmental view in sectional elevation of the body 5 of distributor 4 as viewed along the plane 11—11 of FIG. 5.

FIG. 12 is a fragmental view in sectional elevation of the body 5 of distributor 4 as viewed along the plane 12—12 of FIG. 5.

Figure 13:
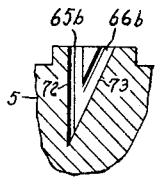

FIG. 13 is a fragmental view in sectional elevation of the body 5 of the distributor 4 as viewed along the plane 13—13 of FIG. 5.

FIG. 14 is a fragmental view in sectional elevation of the body 5 of distributor 4 as viewed along the plane 14—14 of FIG. 5.

Figure 15:
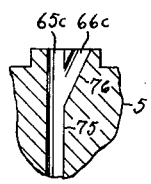

FIG. 15 is a fragmental view in sectional elevation of the body 5 of distributor 4 as viewed along the plane 15—15 of FIG. 5.

Figure 1:
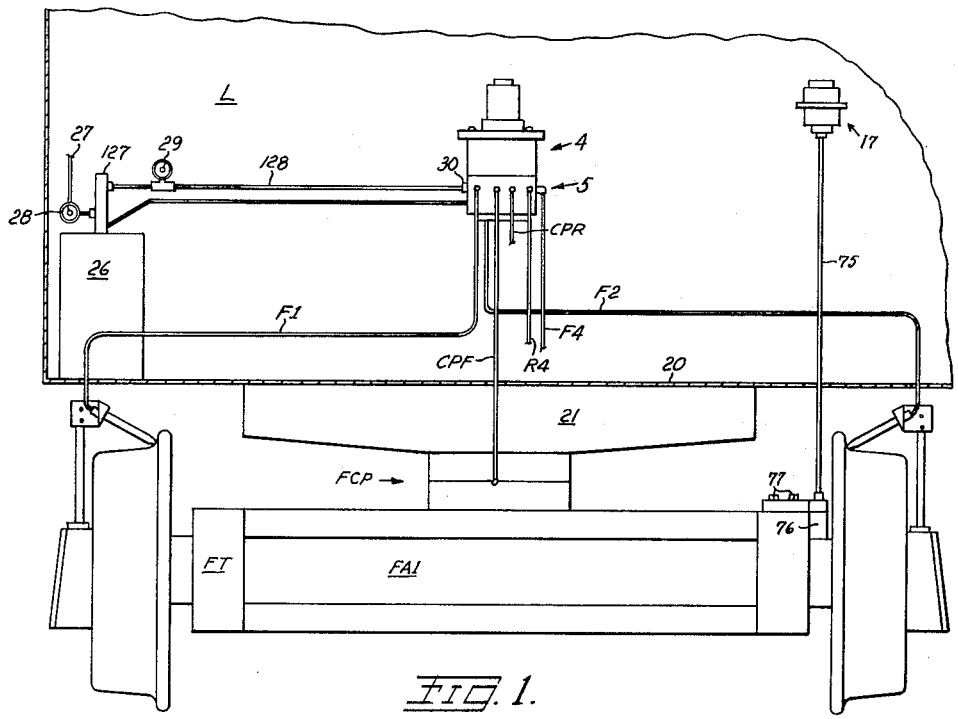
Figure 16:
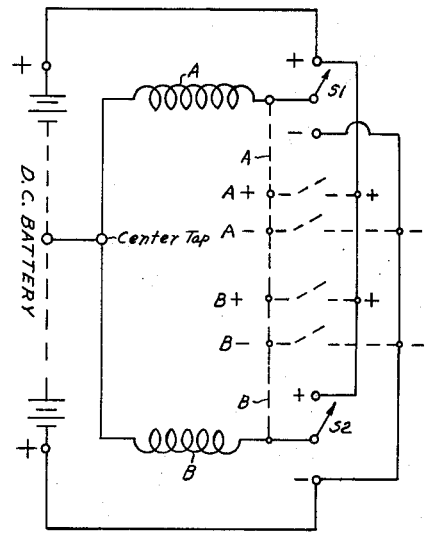

FIG. 16 is a connection diagram based on a diagram furnished by the Superior Electric Company of Bristol, Connecticut, U.S.A. for using the continuously sequentially operated switches 31—32 to connect the two motor windings A and B of their SLO-SYN (R) synchronous motor 16, see FIG. 1, as required to cause the motor to operate as a direct current stepping motor. In bulletin SS459, Copyright 1959 by The Superior Electric Company, it is said, "As a D.-C. stepping motor, The Slo-syn synchronous motor can be adapted for use as an incremental positioning device. When used as a control system stepping or 'inching' motor, D.-C. electrical impulses are converted into 400 precise increment for one revolution of the motor shaft. The circuit shown enables a SLO-SYN Motor to be operated as an impulse-driven stepping motor through the use of a D.-C. power source and a suitable switching arrangement." The D.-C. power source used is the center tapped battery shown in FIG. 16 and the switching arrangement here used is the four switch device shown here in FIGS. 17, 18 and 19 in which FIG. 17 is a view in sectional elevation of the housing 17 of FIG. 1 and including therein a side elevation of the switch structure S1 and S2 of FIG. 16.

Figure 17:
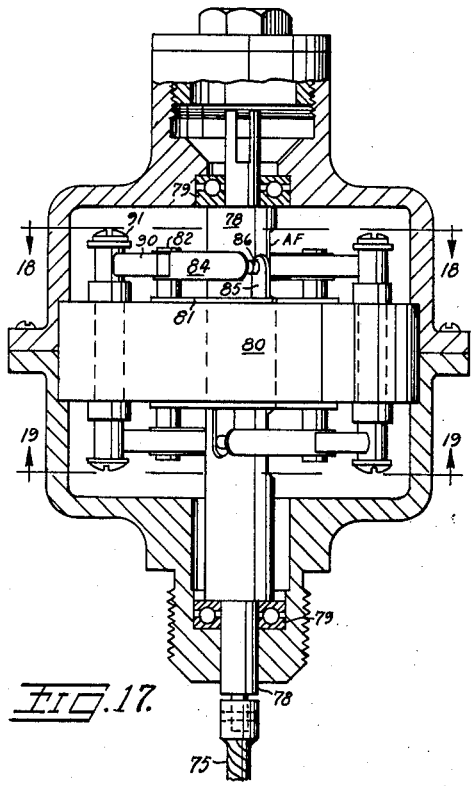
Figure 18:
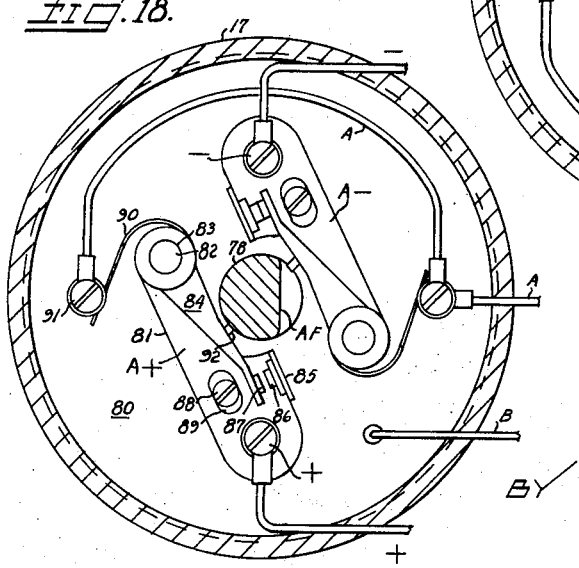

FIG. 18 is a top plan view of the switch structure of FIG. 17 as viewed from the plane 18—18 therein.

Figure 19:
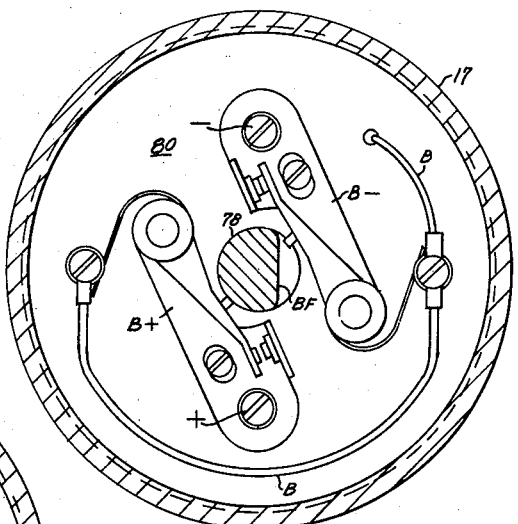

FIG. 19 is a bottom plan view of the switch structure of FIG. 17 as viewed from the plane 19—19 therein.

Like reference numerals of reference refer to like parts in the several figures of the drawing.

Figure 2:
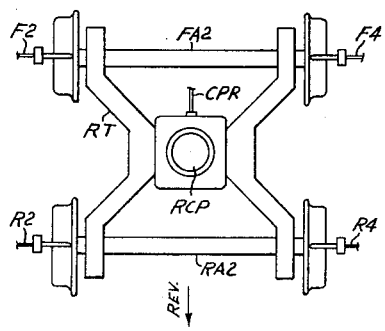
FIG. 2 shows an elementary plan view of two trucks of a locomotive with which the system may be installed to operate.

Referring now to FIGS. 1 and 2, a fragment of the body of a typical locomotive cab L having a floor structure 20 is supported on a front bolster 21 and a similar rear bolster, not shown. The cab is seen to have the front bolster resting on the rotatable top half of a front center plate FCP of which the lower half is seen to be secured centrally on the frame of the forward truck FT.

Similarly the lower half of a rear center plate RCP secured centrally on the frame of the rearward truck RT rotatably carries the top half of the rear center plate RCP which supports the rear bolster, not shown, which supports the other end of the locomotive body.

The drawings indicate without attention to detail that each of forward truck FT and rearward truck RT have a pair of spaced parallel axles FA1, RA1, and FA2, RA2, rotatably supported respectively on the forward and rearward ends of trucks FT and RT. Each of the axles has a wheel secured to each end thereof to rotate therewith and each of the wheels will have a grease applicator therefor supported on its particular truck frame as shown in FIGS. 1 and 2. The wheels and their respective grease applicators are for convenience numbered F1 to F4 and R1 to R4 as shown in FIG. 2 and each applicator can be of the improved design 150 shown in FIG. 3.

It is noted that to provide grease for the eight locomotive wheels and the two centerplates the locomotive will require ten grease tubes from the high pressure grease distributor 4 to the eight grease applicators of wheels number F1, F2, F3, F4, R1, R2, R3 and R4, and one tube each to center plates FCP and RCP.

It has been found convenient to store the grease required in a plurality of similar ¼ barrel containers, 26 of FIG. 1, which may be obtained from Grover Mfg. Co., 850 E. Valley Blvd., San Gabriel, Calif. in accordance with their catalog No. 60–A. A plurality of these ¼ barrel containers may be provided with a single cover interchangeable between them and the cover can be provided with an air operated grease pump to pump the grease from the ¼ barrel container to the inlet of the distributor 4. Air from the train line 27 will be passed through an automatic air shut-off valve 28 design to shut off the air to the pump 127 if the barrel has run out of grease. Air regulator valve 29 controls the pressure of the grease in the system. Grease under pressure from pump 127 through pipe 128 enters intake 30 of the distributor 4 and is transferred through channels, ports and metering pistons until it reaches the proper outlet ports of distributor 4.

As will be later explained more fully, the distributor 4 comprises a stationary body part 5 having a single radial grease inlet 30 and ten radial grease outlets. The single radial grease inlet 30 feeds grease under pressure to an annular grease manifold 130 from which each of five grease conduits are divided by a free piston and slide valve section into two grease outlet sections, F or R, or a total of ten grease outlets from said stationary body part 5.

In further explanation of the construction and operation of the distributor 4 forming an essential part of this invention reference is made to FIGS. 4 to 15 of the drawing.

Referring now to FIG. 4, the stationary body part 5 of grease distributor 4 is secured to distributor assembly plate 31 by five cap screws 32 drawn tight to clamp cylindrical case band 33 between body 5 and plate 31 to form valve chamber 34 within which the rotary slide valve 6 will be rotated about its stationary axle bolt 35 with which parts 5 and 6 are secured together between bearing 36 under the head 37 of bolt 35 and pressure equalizing plate 38 under the retaining nut 39 on the other end of bolt 35. The bearing 36 allows the rotary slide valve 6 to rotate freely about the stationary axle bolt 35 while bolt 35 secures the downward face 6—6 of rotating valve 6 against the upward face 5—5 of stationary body of 5 of distribtor 4.

End plate 40 of inching motor 41 is secured to motor mounting collar 42 by screws 43, one shown, which in turn is secured to plate 31 by cap screws 44.

Within the lower extension 45 of inching motor 41 is a planetary gear speed reducing element having an output shaft 46 secured by driving key 47 to coupling 48 having spanner pins 49 for free engagement in holes 50 to drive rotary slide valve 6 at each impulse of the motor 41 the angular dimension A, FIG. 6.

In further explanation of the function of distributor 4 FIGS. 4 to 15, note first FIGS. 4, 5 and 6 for the locations of mating surfaces 5—5 and 6—6 and also for the character of these surfaces, first remembering that these surfaces need only be complete where and when the oil conduits mate therethrough.

Noting that FIG. 6 is an upward plan view, as indicated in FIG. 4, of the mating lower face of rotor 6 and thus FIG. 7 is a reverse sectional elevation of rotor 6 as shown in FIG. 4, it is seen that the working face of rotor 6 has four equally radially spaced grooves 51 sunk therein which together with circular recess 52 leaves the surface of rotor 6 to comprise only five equally radially spaced lands 53. In FIG. 6 on the right hand end of section line 7—7 and rotating around axle 35 in steps of 36 degrees it is noted that a transfer conduit D1 in rotor 6, line 65 of FIG. 6, connects holes 65c and 65b in body 5 and a second transfer conduit D3, in rotor 6, line 65 of FIG. 6 connects holes 65d and 65e in body 5. Note particularly that FIG. 4 is schematic and is intended to show functionally on the right the structure of body 5 in a vertical plane 65 including the axis of bolt 35, and also on the right the structure of rotor 6 when its two transfer conduits D1 and D3 are in the plane 65. Now when rotor 6 has moved to the right until the vertical plane of transfer conduits D2 and D4 of rotor 6 coincides with the plane 66 of body 5 the movement of free piston 54 in cylinder 55 is reversed to change the outlet from which grease is discharged from forward F to reverse R.

Continuing with the description of distributor 4, FIGS. 4 to 15, note in FIGS. 4 and 5 that the entire surface 51 of body 5 is recessed away from the mating surface lands 53 of rotor 6 except where the five circumferentially spaced sections of each of the five radially spaced lands of rotor 6 are matched on body 5.

Remember that the train air supply line 27, FIG. 1, continuously actuates grease supply pump 127 to maintain a grease supply pressure of 1500–1800 p.s.i. in hose 128 leading to inlet 30 of distributor 4 and from inlet 30 through conduit 129 to grease inlet manifold 130 formed around the extension of axle bolt 35 from its bore through body 5 into the cylinder 131 where piston 132 is secured on the reduced diameter end of bolt 35 by equalizing plate 38 and nut 39. O-rings 58 and 59 can be used to prevent grease movement about bolt 35 and piston 131 if found necessary.

Note that in FIG. 4 the illustration of the grease flow through the distributor is schematic and particularly illustrates the use of a free piston mechanism selectively to feed grease to a forward or a reverse grease conduit F or R depending on the direction of operation of the rotary sliding valve 6 driven by inching motor 41 controlled by stepping switch 17 to run in the direction of forward axle FA1. See FIGS. 1 and 2.

In FIG. 4 the same floating piston 54 is seen to be freely movable up or down in its cylinder 55 into which it is sealed and limited in travel by plug 56 threadedly positionable in cylinder 55 from its lower open end 57 to determine the amount of grease discharged to outlets F and R at each stroke of the piston 54. The outlet F or R to which grease is discharged at each stroke, up or down, of piston 54 is seen to be determined at each 18 degree rotary or inching step of rotor 6 by the radial positions of transfer conduits, D1, D3 and D2, D4, as previously described. With the transfer conduits in their positions, D1, D3, as seen in FIGS. 4 and 6, the high pressure grease from inlet 30 will be seen to move through transfer conduit D1 and into cylinder 55 under piston 54 to move piston 54 upward and force the grease previously accumulated above piston 54 in cylinder 55 out through D3 to outlet F. Similarly when the transfer conduits are in their positions D2, D4, as seen in FIGS. 4 and 6, the high pressure grease from inlet 30 will be seen to move through D2 and into cylinder 55 above piston 54 to move piston 54 downward and force the grease previously accumulated in cylinder 55 under piston 54 out through D4 and on to outlet R. And should climatic conditions make it necessary to take extra precautions to be sure there will be no binding of the mating surfaces of rotor 6 and body 5 or with axle 35 the body 5 is provided with a series of 10 equally spaced equalizing cylinders 60 formed upwardly into the body 5 to receive 10 equalizing pistons 61 secured by coaxial studs 62 threadedly secured onto equalizing plate 38. Each of the cylinders 60 are connected into a respective outlet conduit F or R so that not only the inlet pressure in manifold 130 but also the outlet pressure in cylinders 60 will assure that all the working surfaces of distributor 4 are greased at all times and that all the forces centered about the axle 35 will be symmetrically balanced.

Now returning to FIGS. 4 and 5 it is to be remembered that with only one floating piston, as shown in FIG. 4 with its two stroke positions, we can discharge grease according to the direction of travel of the locomotive selectively from one of two grease outlets, F and R. But as previously described the grease distributor 4 for the locomotive described requires five individual free pistons to discharge sufficient grease when required from the set of discharge outlets F or R of FIG. 4.

In FIG. 5 it is seen how five individual 2 outlet systems like that of FIG. 4 are formed in a single body 5 of distributor 4.

Around the edge of the body 5 of FIG. 5 are shown a single grease inlet 30 and 10 grease outlets numbered in pairs as F1–R1, F2–R2, F3–R3, F4–R4 and CPF–CPR. Each of the 5 systems include a single free, or floating, piston FP. Each of the grease outlets have leading centrally thereto a grease outlet conduit 63 with an equalizer conduit 64 leading downwardly therefrom into equalizer cylinder 60. Each of the five outlet systems are, for convenience of reference, numbered respectively I, II, III, IV and V.

It should be noted in FIG. 5 that the top surface of body 5 includes in each of the sections, as in section IV, the 5 radially spaced sections of lands 53. And in each section, as in section III, radial lines 65 and 66, spread at 9 degrees one from the other, show the location in line 65 of the body surface holes which must be connected by transfer conduits D1 and D3 when grease is fed from outlet F3 and the location in line 66 of the body surface holes which must be connected by transfer conduits D2 and D4 when grease is fed from outlet R3.

Now arbitrarily using the reference numbers 65a, 65b, 65c, 65d and 65e, radially serially outwardly along line 65 to indicate the surface holes in lands 53 and similarly numbers 66a, 66b, 66c, 66d and 66e to indicate the holes along line 66, note in FIG. 4 that the grease inlet line 30–129–130 is always connected to surface holes 66c of each section of body 5. And in each sector I, II, III, IV and V of body 5, the upper and lower ends of cylinders 55 of free pistons 54 are respectively connected to holes 65d and 65b.

In FIG. 5 it is to be noted in each of the five sectors of body, 5, a respective one of the oulets F or R is always connected to its respective equalizer cylinder 60 but the outlet and the cylinder are connected, see FIG. 5, into its respective circuit only when D3 is open to 65e or D4 is open to 66a.

Referring to FIG. 10, a drain hole 67 is seen to be available if required to drain excessive grease from the depressed surface 51 of body 5 into hole 68 plugged when not in use.

In FIGURE 11 the grease outlet CPF for supplying grease to the forward centerplate FCP of the pair of trucks, FT and RT, is shown to be connected by conduit 69 to surface hole 65e in body 5.

In FIGURE 12 it is to be noted that each of the surface holes 65d and 66d in body 5 are connected by conduits 70 and 71 respectively to the upper end of free piston cylinder 55 whereby in the regular rotation of rotor 6 grease is first forced into the top of cylinder 55 by transfer D2 and out to an F grease outlet through a D3 transfer.

In FIG. 13 it is seen that surface holes 65b and 66b are permanently connected through conduits 72 and 73.

In FIG. 14, conduit 74 is seen to connect surface hole 66a with grease outlet tube 63 leading to grease outlet R.

In FIG. 15, surface holes 65c and 66c are seen to be connected by conduits 76 and 75 with inlet manifold 130.

Remembering that the direction of travel of the train determines the rotation of the wheels and therefore the rotation of the rotor 6 of the distributor 4 and it is seen in FIG. 4 that in one direction of rotation one of the lines from holes 66a and 65a will discharge to grease line R and one of the lines from holes 65a and 65e will discharge to grease line F. In each of the sectors I, II, III, IV and V, in one direction of rotation all of the grease discharged from the section will be from either an F or an R hole and in the other direction of rotation all of the grease discharged from the section will be from the other of the F or R holes and the F or R hole from which the grease is discharged will be determined by the end of the train called "Forward" or "Reverse."

In FIG. 5, the stator 5 of distributor 4 is seen to include 5 pie shaped sectors numbered consecutively in clockwise rotation around the outer rim of stator 5 with Roman numerals I, II, III, IV and V. As seen typically in sector IV each of the sectors have a radially spaced group of five planar lands 53 between which the grooves 51 and 52 are cut away so that as rotor 6, see FIGS. 4 and 6, is rotated by spanner pins 49 of coupling 48 on shaft 46 of motor 41 the flat faces of the five circular lands of rotor 6 will be continuously lapping with the five mating sections of lands 53 in the respective sectors I to V of stator 5, FIG. 5.

As seen typically in sector III of FIG. 5, along radial lines 65 and 66, spaced angularly nine degrees as shown, a series of holes 65a to 65e and 66a to 66e are sunk into the lands 53. And spaced on adjacent radial sides of the five lands 53 of each of the sectors I to V, see sector I for example, Forward (F1) and Reverse (R1) grease outlet holes are formed radially inwardly into stator body 5, FIG. 5. And as seen in each case smaller diameter holes 63 extend inwardly from the grease outlet hole to near the appropriate hole 65a or 66a where required.

A single inlet grease pipe coupling hole 30 for grease pumped by high pressure grease pump 127 from tank 26, FIG. 1, is connected by conduit 129 to grease inlet manifold 130 from where it is maintained under pressure in each sector I, II, III, IV, V, through conduits 75, 76 to the holes 65c, 66c, in the land sections of each sector. FIG. 15 is typical in sector II. Then in each of the sectors, I to V of FIG. 5, there is a single free piston 54, as seen on the right hand side of FIG. 4, which will be moved to the upper end of cylinder 55 when transfer conduit D1 connects hole 65c to hole 65b to put grease under pressure from manifold 130 to the lower end of piston 54 in cylinder 55. Again, as shown, when grease under pressure at the underside of piston 54 pushes piston 54 upwardly the grease held in cylinder 55 above piston 54 will be pushed outwardly through hole 65d about cylinder 55.

Now rotor 6 is seen to have a plurality of pairs of transfer conduits D1 and D3 sunk therein so that when D1 and D3 are registered with line 65 of any sector in body 5, the conduit D1 will connect hole 65c with hole 65b and the lower end of cylinder 55 to force piston 54 upward. And with conduit D3 connecting surface holes 65d and 65e the upward movement of piston 54 will force the grease from above piston 54 out through D3 and conduit 69 to the grease outlet F.

Then note in FIG. 6 that if the rotary spacing A between adjacent lines 65 and 66 is selected to be 18 degrees, a 36 degree or 2 step movement of rotor 6 will cause a 2 stroke or both up and back cycle of the piston 54 in its sector of stator 5, FIG. 5.

As previously shown wheel axle FA1, gears 76, shaft 75, battery, FIG. 16, and switch, FIG. 17, are connected through inching motor 41 to cause rotor 6 of distributor 4 to be driven at a speed and direction of rotation compatible with the wheels of axle FA1.

And as previously shown for the grease supply and control of sectors I to IV, with the grease being supplied from the manifold 130 to the grease outlets F (forward) or R (reverse) of their respective sectors, the grease will be supplied through the lines of holes 65 as controlled by the transfer conduit line D1, D3, when the train is going in the forward direction and will be supplied through the lines of holes 66 as controlled by the transfer conduit line D2, D4, when the train is going in the reverse direction. Thus when this train is running in one direction continuously so that the periodic ejections of grease required must always be from a periodic upward or periodic downward stroke of the single piston in each of the sectors it will be necessary that between each of lines of holes 65 in each of the stator sectors having a rotor control line of transfer conduits D1 and D3 there will be a line of stator holes 66 controlled by a line of rotor transfer conduits D2 and D4 for changing the up or down motion of the piston 54 and supplying a new charge of grease for the next ejection of grease in the right direction.

However in supplying grease through lines CPF and CPR to centerplates FCP and RCP the direction of train travel is not involved particularly but only the quantity and periodicity of the grease ejected is of interest as that on one stroke of piston FP in sector V grease is ejected through hole 65e and conduit 69 to CPF as seen in FIG. 11. While in the other stroke of the piston grease will be ejected to CPR.

And it should not be forgotten that threaded plugs 56, held upward into cylinders 55 by lock plugs 57 will variably position each of the pistons 54 to determine the quantity of grease storable in cylinder 55 above piston 54 and thus control the length of stroke of piston 54.

By thus controlling the length of stroke of piston 54 the limit of movement of grease to any of the exhaust parts can be kept to a minimum so that recharge limit of motion of piston 54 will be only enough to store sufficient grease for the next forward ejection stroke.

Without going deeply into the design of the Slo-syn Motor for which applicant is in no way responsible, it should be noted that the motor is of the permanent magnet synchronous type having a permanent magnet rotor and a stator with a two element winding adapted to incrementally position the rotor angularly in the stator by incrementally charging the power applied separately to the coils A and B positioned electrically at 90 degrees one from the other in a one cycle space of the motor. In the present motor the cycle space is approximately one fiftieth of the total angular length of the motor air gap and for the required positive and smooth operation required of the motor the number of power impulses applied to the motor for each revolution is about 400 impulses or steps per revolution of the motor or about 8 impulses per cycle.

It should be remembered that the motor is to be used to drive the grease distributor above explained for periodically applying grease to the wheels and centerplates of a locomotive moving at a speed of anywhere from zero to 100 miles per hour which has previously been accomplished by ratchet gearing driven by a friction wheel in contact with drive wheel of the locomotive. While such equipment is functionally satisfactory it has maintenance problems best avoided and found to be avoidable with the present stepping motor if a satisfactory control for the stepping motor could be had.

The manufacturer of the stepping motor offered for the desired purpose only the control circuit shown in FIG. 16 wherein the power supply to the motor is from a D.C. battery of some 40 volts total voltage having a center tap at half the voltage from either terminal. The battery center tap is connected to one end each of the two inching windings A and B of the stator of the motor and the other ends of the windings A and B are respectively connected to the hinge ends of switches S1 and S2 which are intended to be moved at each step, or one-eighth cycle, of the motor to reconnect the battery to the A and B coils to make the coils most effective in the next step of the motor.

The manufacturer suggests on page 8 of his bulletin SS459 that the control steps of the 400 step per motor revolution be made 8 steps per cycle with the steps of the cycles repeating while the motor is in operation. The suggested switch positions for one cycle of the motor are as follows:

| Step | 1 | 2 | 3 | 4 | 5 | 6 | 7 | 8 | 1 |
|---|---|---|---|---|---|---|---|---|---|
| Switch position: | | | | | | | | | |
| SW 1 | + | Open | − | − | − | Open | + | + | + |
| SW 2 | + | + | + | Open | − | − | − | Open | + |

But neither the motor manufacturer nor any control manufacturer known to me was able to sell or show me a switch capable of doing the work shown to be required in stepping this motor. After giving the problem careful study and making a number of unsuccessful trials I have been fortunate in conceiving both a successful method of attacking the problem and a successful means for solving it.

Note that, in scheme, I have by-passed the switch S1 (full lines) with two single throw, single pole switches A+ and A− (shown dotted) and also by-passed the switch S2 (full lines) with two single throw switches B+ and B−, shown dotted. In each case the switch letter, A or B, designates the coil being switched to a particular battery polarity and the polarity mark, + or −, designates the battery polarity to which the coil is switched.

The switch positions for one cycle of the motor will now be as follows:

| Step | 1 | 2 | 3 | 4 | 5 | 6 | 7 | 8 |
|---|---|---|---|---|---|---|---|---|
| Closed switch positions. | A+<br>B+ | Open<br>B+ | A−<br>B+ | A−<br>Open | A−<br>B− | Open<br>B− | A+<br>B− | A+<br>Open |

Referring now to FIGS. 1 and 16 to 19, in FIG. 1 it is noted that the flexible shaft 75 has one end driven at a one to one ratio from a forward running axle FA1 by a gear box 76 secured on truck FT to which it is geared by screws 77. Flexible shaft 75 is seen in FIG. 17 to be secured at its other end to cam shaft 78 freely rotatable on bearings 79 through a coaxial hole in insulated base 80 secured coaxially in switch body 17.

To take the place of the schematic single pole double throw switches S1 and S2 of FIG. 16 applicant here provides the novel and useful combination of four, shaft cam operated, single throw single pole switches, A+, A−, B+ and B−. In FIG. 18 the switches A+ and A− take the place of switch S1 of FIG. 16 and in FIG. 19 the switches B+ and B− take the place of switch S2 of FIG. 16. All of the cam operated switches, A+, A−, B+ and B−, are identical and the two cam flats AF and BF on shaft 78 are identical and parallel. Taking the structure of switch A+ as typical, note that stationary contact base element 81 of switch A+ lies flat on the surface of insulated base 80 and pivots parallel thereto about pin 82 insulated by sleeve 83 to support moving contact arm 84 pivotally thereabout. Upstanding from base element 81 is bracket 85 to which stationary contact 86 is welded and adjustably positioned toward moving contact 87 by eccentric headed screw 88 rotatably secured in insulated base 80 with its eccentric head protruding upwardly through slot 89 of base element 81. Insulated by sleeve 83 from pin 82 is spring 90 secured at one end to moving contact arm 84 and braced at the other end on moving contact terminal post 91 to bias moving contact 87 toward stationary contact 86. Insulating cam follower 92 extending from the contact side of moving contact arm 84 rides the surface of shaft cam 78 to keep moving contact 87 out of contact with stationary contact 86 except where follower 92 drops from the cam outer surface onto the flat face AF of the cam.

Switches A+ and A−, on one face of insulator 80 are timed by their individual riders 92 radially oppositely set with respect to shaft 78 in their moving contact arms 84 while switches B+ and B− on the other face of insulator 80 are also timed by their individual riders 92 radially oppositely set with respect to shaft 78 in their moving contact arms 84 but the plane including the axis of shaft 78 and the riders 92 of switches A+ and A— is normal to the plane including the axis of shaft 78 and the riders of switches B+ and B— so that as shaft 78 rotates the four switches A+, A—, B+ and B— will be operated consecutively at about 90 degree spacing and because of the angular lengths of the parallel cam flats AF and BF the angular length of the operation of each switch will be about 120 degrees. With the above arrangement of direct current strength and timing for one polar cycle of eight steps per revolution of the timer switch, fifty consecutive cycles of the timing switch or rotations of timing shaft 78 will give the stepping motor the 400 impulses or steps of direct current power required for one revolution thereof.

Thus fifty revolutions of the stepping switch shaft steps the stepping motor one revolution and turns the rotor of the grease distributor one revolution to give the forward running wheels of the locomotive and one of the centerplates a grease application.

It has been found by test that it is not unusual to find it desirable to grease the locomotive wheels at about ten times a mile or every 528 ft. of travel. With wheels about ten feet in circumference this greasing interval is about 53 revolutions of the locomotive wheels or 53 revolutions of the shaft 78 of the stepping switch or about 53/50=1.06 revolutions of the stepping motor or of the rotor of the grease distributor.

Remembering that the grease distributor is adjustable as to the amount of grease emitted per shot from each outlet and that the planetary gearing between the stepping motor and the rotor of the grease distributor has available a selection of gears with which the speed of the rotor can be selected to suit almost any road condition, it is seen that the stepping motor with applicant's present stepping switch provides a novel and useful combination with which the problem of speed change in this field is eliminated.

Now remembering that the grease applicator 24 or 25 of my previous U.S. Patent No. 2,935,159, and first disclosed in my U.S. patent application Ser. No. 587,677, filed May 28, 1956, now Patent 2,885,029, was the first grease applicator successfully used for its purpose, my improved applicator 150 of FIG. 3 is shown in the present combination of the present invention of a new and useful directionally selective lubricating system.

Figure 3:
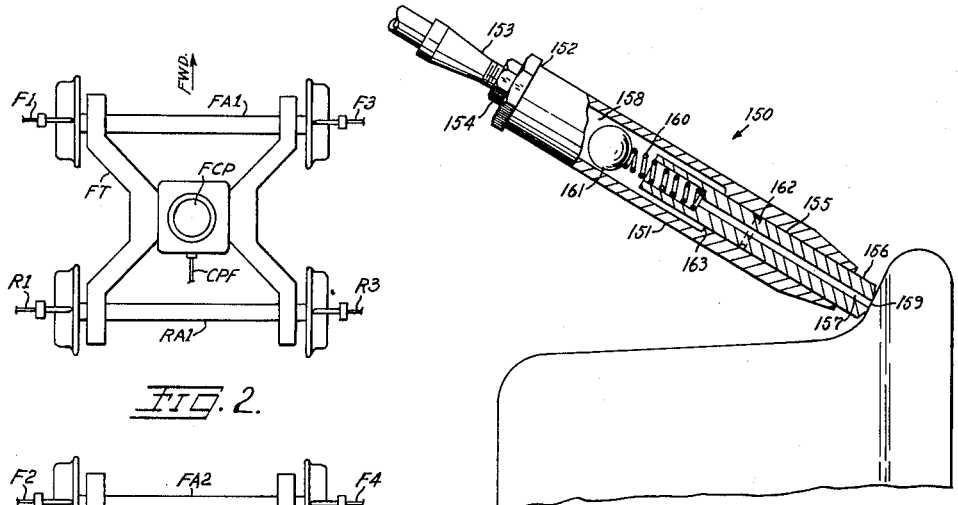
FIG. 3 shows a longitudinal side elevation in partial section of the improved grease applicator of this invention in grease applying position on one of the locomotive wheels.

As shown in FIG. 3 the improved applicator 150 is to include body 151 internally threaded at its inlet end 152 to receive pipe fitting 153 secured in position by locknut 154. At its inner diameter 155 applicator 150 is adapted slidably to receive telescopic grease point 156 bored to a smaller outlet channel 157 to pass grease from storage chamber 158 to wheel flange 159. Note that the inlet end of point 156 is bored to receive compression spring 160 biasing ball valve 161 away from the entrance to grease point 156 in chamber 158 to pass grease from chamber 158 through channel 157 to wheel flange 159.

Marker 162 around the outside of point 156 will show at outlet of body 151 when the hardened steel end of point 156 has worn to indicate its need for replacement. Further wear of the hardened steel end of point 156 will finally allow ball 161 to seat on internal shoulder 163 of body 151 and thus prevent an excessive loss of grease until point 156 is renewed.

Having recited some of the objects of this invention, illustrated and described a preferred means by which the methods of this invention may be practiced and explained its operation, I claim:

1. A directionally selective lubricating system for a plurality of wheels of a railroad train, said system including a source of grease under pressure, a grease applicator for each of said wheels, a grease distributor having an inlet and an inlet conduit for receiving grease from said source and delivering grease under pressure from said source to said inlet, said distrbutor including a plurality of sectors each of which sectors includes an alternate conduit means for receiving grease under pressure from said inlet of said distributor and conducting said grease alternately from each of a pair of outlets from said sector to a pair of applicators at a selected pair of said wheels, said distributor including a rotary slide valve means and motor means for rotating said slide valve means at a preset ratio with the rotation of said wheels and said alternate conduit means of each of said sectors of said distributor including a cylinder in each sector having a free piston therein and said rotary slide valve means driven by said motor to control said free piston in said sector first to emit the grease therefrom through one of said grease outlets to one of said applicators of one of said wheels when said train is running in one direction and then to emit the grease therefrom through the other of said grease outlets to the other of said applicators of the other of said wheels when said train and said wheels are running in the other direction.

2. A directionally selective lubricating system for periodically selectively lubricating the gauge flanges of a pair of locomotive wheels arranged to run in tandem on the same rail of a railroad track, said system being directionally selective to lubricate the gauge flange of the one of said wheels turning in the forward direction of said locomotive, said system including a grease applicator for the gauge flange of each of said wheels whereby grease applied to said wheel flanges by said applicators will in part transfer to the gauge flange of the mating track rail and from the track rail to the following wheel flange in sufficient amount to keep the wheel flanges and rails free of excessive wear, said system including for the applicators of said pair of wheels a distributor section having a single grease inlet for receiving grease under pressure from a source thereof, a pair of grease outlets for selectively supplying grease to the respective applicator supplying grease to the forward running wheel, motor means for driving said distributor, switch means for controlling said motor means and means for driving said switch means in synchronism with the speed of said wheels whereby said distributor section will receive grease under pressure from said source thereof and supply said grease in measured quantities at measured intervals to the applicator of the forward running one of said wheels and selectively to supply said grease to the applicator of the other of said wheels whenever the direction of said locomotive is reversed.

3. The system of claim 2 in which said applicator includes a cylindrical hollow body threadedly closed at its grease inlet end by a pipe fitting receiving and securing to said body a conduit connected to bring grease from one outlet of said distributor to a grease chamber in said body, said chamber having a ball valve freely slidable therein, said applicator including a grease applying point of hardened steel material having a cylindrical outer surface of less diameter than said ball valve, said point being bored at its chamber end to receive a coil compression spring axially extending therefrom to bias said ball valve in said chamber away from the inlet end of said point, said point from the bottom of its spring socket to its outlet end being bored with a smaller axial grease discharge hole therethrough, said body from its said chamber to its outer end being formed with an axial hole therethrough slidingly to receive said grease applying point but smaller than said ball to form a seat for said ball valve when said point moves sufficiently away from said body, said point being marked circumferentially therearound at a position to show extended from said body that said ball is closed on its seat and said point is sufficiently worn at its point to require renewal.

4. The system of claim 2 in which said motor means for driving said distributor is an inching motor driven sequentially from a selected one of a multiple of electricity sources at a required rate by a specific number of said electric impulses per revolution of said motor, said switch means is a means mechanically driven by said locomotive at a specific ratio of rotation of said switch means to the rotation of the wheels of said locomotive, said motor having a plurality of energizing components regularly spaced apart mechanically and electrically and said switch means including a plurality of regularly spaced switches for regularly connecting said motor components to said sources of electricity to rotate said motor with said distributor to send grease through said distributor to said flanges spaced every preset length of track without regard to the speed of said locomotive.

5. A grease distributor having a rotor and a stator with a single grease inlet to which grease under pressure is always available from a source thereof and a plurality of pairs of grease outlets from each pair of which the quantity of the grease ejected per revolution of the distributor rotor can be preset and the sequence of the grease ejection for a specific purpose can be preset, said distributor comprising a stationary body, a rotor having a plurality of alternately radially spaced pairs of transfer conduits and a motor for rotating said rotor at a desired speed coaxially on said body, said motor being secured coaxially on a mounting collar which, in turn, spaces said motor from a distributor assembly plate secured to said body stator by a circumferentially spaced series of five bolts clamping a cylindrical case band between said body and said assembly plate to form a valve chamber within which the under face of the valve part is rotated on the top face of the stator on an axial bolt neatly aligned in axle holes formed through the distributor valve part and its body part, the relatively rotating, sliding face surfaces of said body part and said valve part being carefully lapped one against the other to avoid all friction and said axle bolt being supported at its upper end by a frictionless bearing between its head and its position of rest on the top of said valve part and arranged to be vertically positioned at its nut end by a piston movable axially with said bolt and subject to the inlet pressure of said grease for movement in one direction and to the outlet pressure of said grease for movement in the other direction.

6. A grease distributor having a rotor and a stator with a single grease inlet in said stator to which grease under pressure is always available from a source thereof and a plurality of pairs of grease outlets from each pair of which the quantity of grease ejected per revolution of the rotor can be preset and the sequence of the grease ejection for a specific purpose can be preset, said distributor comprising a stator, an axle bolt, a rotor and motor means for rotating said rotor at a desired speed, coaxially on said stator, the mating faces of said rotor and said stator being carefully finished within the capillary thickness of said grease, each of said faces being formed with a series of radially spaced grooves therein each separated by a series of five radially spaced lands smoothly mating with the lands of the other surface, the body of said stator being schematically divided by planes including the axis thereof into five equal sectors of 72 degrees with a grease inlet for said distributor formed radially inwardly from one side of one of said sectors to a grease manifold 130 formed in said stator around said axle bolt and with a pair of grease outlets for each of said sectors formed radially inwardly from the side of said sector at about 18° on either side of the center of said sector, a first radial line of holes formed in the top of said distributor sector radially consecutively formed in surface lands $a$ to $e$, a second radial line of holes formed in the top of said distributor sector radially consecutively formed in surface lands $a$ to $e$, said first and second lines of holes being each formed at its respective angle of 4½ degrees on its side of the center of said section, said $d$ hole in both said lines being extended downwardly into the body of said sector to enter the top of a cylinder having a free piston enclosed therein, said $b$ holes in both said lines being extended into the body of said sector to connect said $b$ holes therein with the cylinders, said $c$ holes in both said lines being sunk into said body to connect both said $c$ holes together and to said inlet grease manifold, said $a$ hole of one of said lines and said $e$ hole of the other of said lines being connected with its respective grease outlet only when said rotor of said distributor is being turned in its appropriate direction.

7. The grease distributor of claim 6 in which the face of said rotor is divided angularly by twenty equally angularly spaced lines of four radially spaced holes, ten of said lines spaced 36 degrees apart having four holes radially spaced in rotor lands 53 to mate with stator land holes 65$c$ and 65$b$ and holes 65$d$ and 65$e$ while the alternate 10 of said lines spaced 36 degrees apart will have their respective four radially spaced holes positioned to mate with stator surface holes 66$a$ and 66$b$ and stator surface holes 66$c$ and 66$d$, the first of said lines of holes having conduits sunk into the surface of said rotor to form transfer conduits D1 and D3 respectively and the second of said lines of holes having conduits sunk into said rotor to form transfer conduits D2 and D4 respectively whereby on the continuous rotation of rotor 6 the transfer conduit D1 will connect stator holes 65$c$ and 65$d$ and conduit D3 will connect stator surface holes 65$d$ and 65$e$ to allow grease under pressure from manifold 130 to one side of piston 54 to push grease from the other side of piston 54 to grease outlet F and thereafter when the alternate line of transfer conduits D2 and D4 of rotor 6 meets with the alternate line 66 of holes in the surface of stator 5, grease under pressure from manifold 130 will be pushed through transfer conduit D2 to one side of piston 54 and if the train is now running in the opposite direction and rotor 6 is running in the opposite direction, grease under pressure on one side of piston 54 will be pushed from the other side of piston 54 to be ejected from the opposite grease outlet R of stator 5.

References Cited in the file of this patent
UNITED STATES PATENTS

| | | |
|---|---|---|
| 1,935,873 | Davis | Nov. 21, 1933 |
| 1,950,143 | Haviland | Mar. 6, 1934 |
| 2,885,029 | Burrell | May 5, 1959 |